July 15, 1930.  J. KUBISH  1,770,788
HELICOPTER
Filed April 19, 1929   2 Sheets-Sheet 1
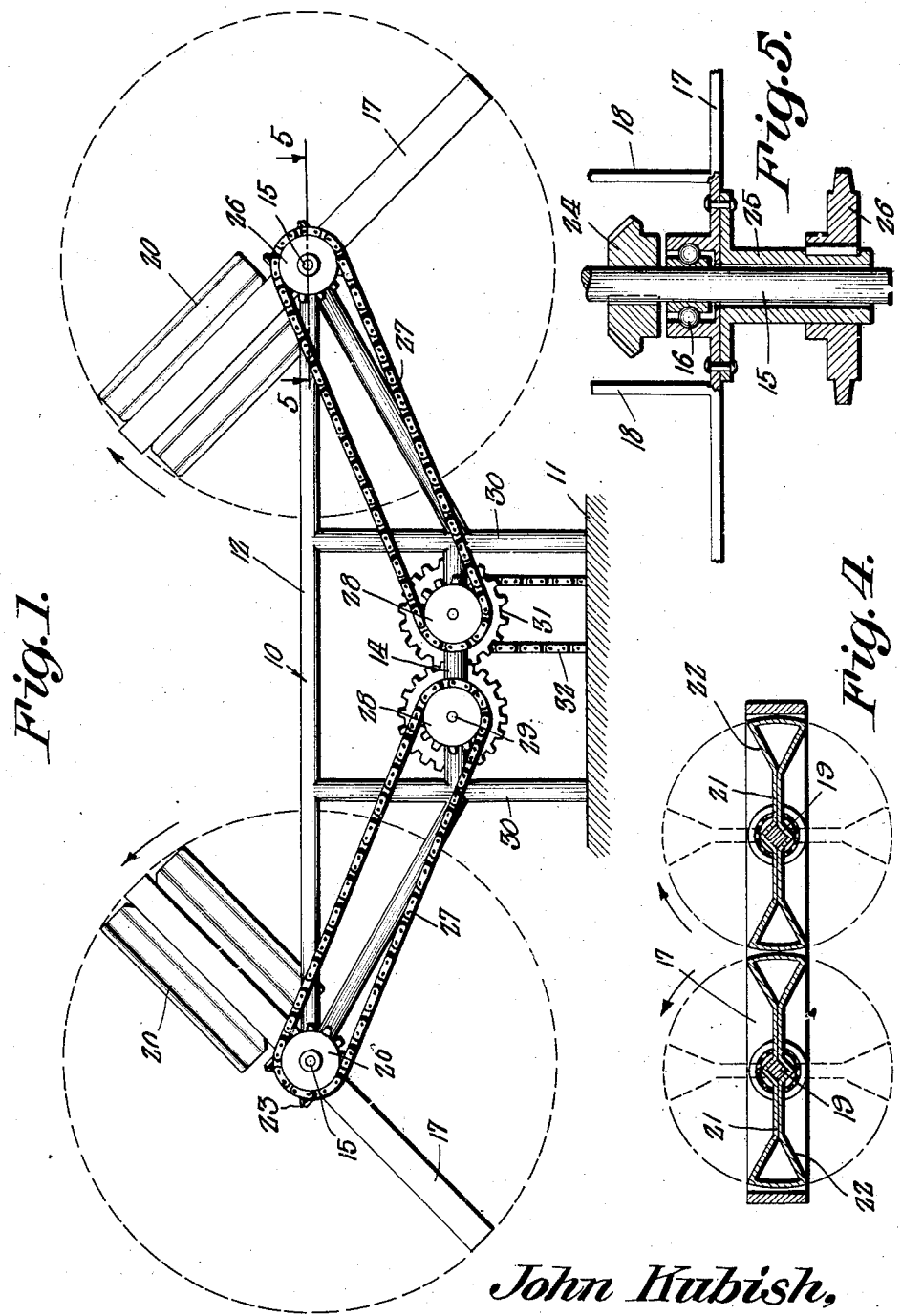
John Kubish,
INVENTOR
BY Victor J. Evans
ATTORNEY July 15, 1930.  J. KUBISH  1,770,788
HELICOPTER
Filed April 19, 1929  2 Sheets-Sheet 2
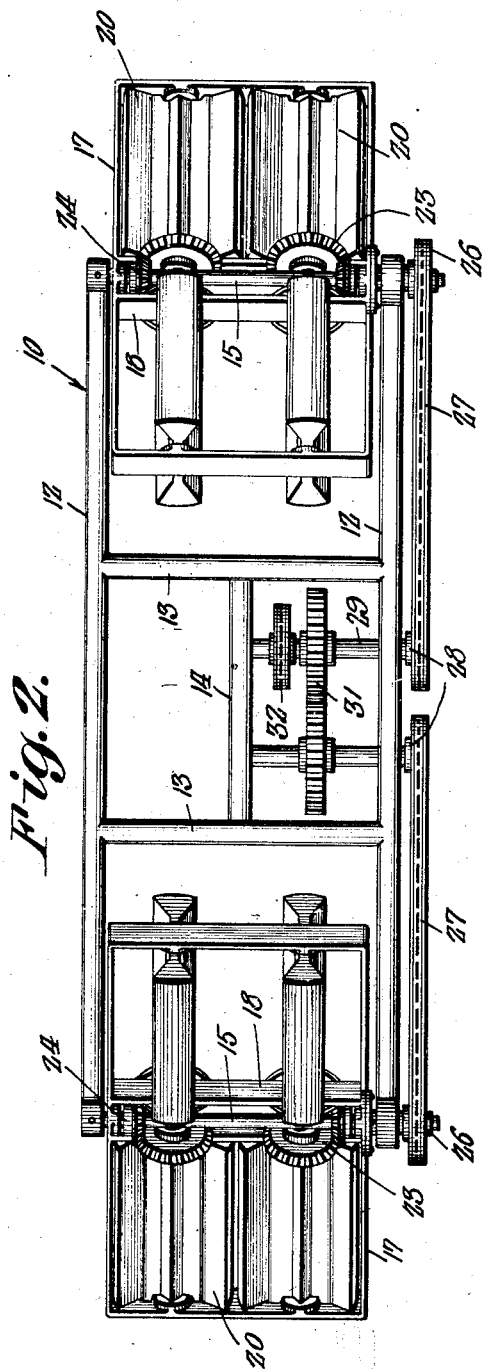
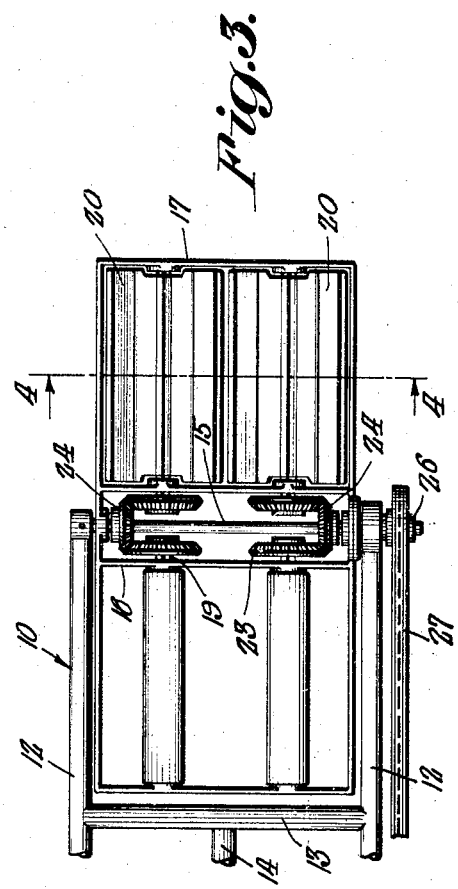
John Kubish,
INVENTOR
BY Victor J. Evans
ATTORNEY Patented July 15, 1930

1,770,788

UNITED STATES PATENT OFFICE

JOHN KUBISH, OF INDIAN ORCHARD, MASSACHUSETTS

HELICOPTER

Application filed April 19, 1929. Serial No. 356,455.

This invention relates to improvements in flying machines, an object being to provide means which may be attached to an airplane or other aircraft, whereby the same may rise or descend vertically, or remain practically motionless in the air.

Another object of the invention is the provision of a machine, which in addition to the above and other advantageous features, is simple in construction, efficient in use and may be operated with a minimum amount of power.

With the above and other objects in view, the invention further includes the following novel features and details of construction, to be hereinafter more fully described, illustrated in the accompanying drawings and pointed out in the appended claim.

In the drawings:—

Figure 1 is a rear elevation of the invention.

Figure 2 is a top plan view of the same.

Figure 3 is a detail plan view showing one of the propellers.

Figure 4 is an enlarged section taken substantially on the line 4—4 of Figure 3.

Figure 5 is a detail sectional view taken substantially on the line 5—5 of Figure 1, the view being on an enlarged scale with the driving chain omitted.

Referring to the drawings in detail wherein like characters of reference denote corresponding parts, the invention as shown comprises a main or stationary frame 10 which may be mounted upon an airplane or other aircraft, a portion of which is shown at 11, or, it may be secured by suitable means to the back of a person and operated by hand or other power.

The frame 10 includes parallel bars 12 which are connected by transverse bars 13 and these last mentioned bars are in turn connected by a bar 14.

Mounted in suitable bearings provided at the outer ends of the bars 12 are stationary shafts 15. Mounted for rotation upon antifriction bearings carried by these shafts are frames 17. The frames 17 are rectangular in shape and are provided with spaced bars 18.

Mounted between the bars 18 and the ends of the frames 17 are aligned shafts 19 and secured upon and rotatable with these shafts are propeller blades 20.

As shown in Figure 4 of the drawings, these blades are made of sheet metal and their intermediate portions 21 are flat while their outer edges include reversely and outwardly inclined faces 22. By reference to Figure 4 of the drawings it will be seen that these blades provide pockets in their opposite faces which, when the frames 17 are rotated, as will be presently described, act to force the air inward from the opposite side edges of the blades to compress the air upon the under surface of said blades and materially assist in lifting action. As the blades are adapted to rotate during their operation, their opposite faces are of like construction.

Mounted upon the inner end of each of the shafts 19 is a beveled gear 23, the opposite beveled gears being engaged by stationary beveled pinions 24 which are fast upon the shafts 15. The outer ends of the shafts 15 are surrounded by sleeves 25 whose inner ends are secured to the frame 17 and whose outer ends have secured thereon sprockets 26. These sprockets are engaged by chains 27 which are driven by sprockets 28, the last mentioned sprockets being mounted upon shafts 29. These last mentioned shafts are mounted in suitable bearings provided in a supporting structure 30 which supports the frame 10 and which connects said frame with the aircraft 11. The shafts 29 are connected by gears 31 so that these shafts rotate in opposite directions and may be driven by any suitable means. The means shown consists of a chain and sprocket drive 32 which may be operated from any suitable source of power.

It will be seen from the foregoing description and accompanying drawings that as the frames 17 are rotated in the direction of the arrows shown in Figure 1 of the drawings, during the outer or down stroke of the frames, the blades 20 will present a flat surface to the resistance of the air. This is due to the gears 23 and 24, the latter being stationary with respect to the frame 12 while the frames 17 and gears 23 are rotating. Upon the inner or up stroke, the blades 20 present their edges to the air so that they offer very little resistance.

The invention is susceptible of various changes in its form, proportions and minor details of construction and the right is herein reserved to make such changes as properly fall within the scope of the appended claim.

Having described the invention what is claimed is:

In a helicopter for air craft, a stationary frame, shafts mounted in said frame, a frame mounted for rotation upon each shaft and extending at diametrically opposite sides thereof, shafts rotatably mounted in the sides of each frame parallel to one another, blades mounted upon each of the last mentioned shafts and extending in diametrically opposite directions therefrom, each of said blades comprising a flat-sided inner portion and a hollow outer portion having outwardly flared sides, the blades at one side of each shaft being positioned in planes at right angles to each other, means for imparting rotary motion to said frames in opposite directions, and means for imparting rotary motion to the blade carrying shafts in opposite directions.

In testimony whereof I affix my signature.

JOHN KUBISH.